United States Patent
Boulton

(10) Patent No.: US 11,336,661 B2
(45) Date of Patent: May 17, 2022

(54) DETECTING REMOTE APPLICATION PROFILING

(71) Applicant: BlackBerry Limited, Waterloo (CA)

(72) Inventor: Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/111,086

(22) Filed: Aug. 23, 2018

(65) Prior Publication Data

US 2019/0116195 A1    Apr. 18, 2019

Related U.S. Application Data

(63) Continuation of application No. PCT/EP2017/076605, filed on Oct. 18, 2017.

(51) Int. Cl.
*G06F 21/52* (2013.01)
*H04L 29/06* (2006.01)

(52) U.S. Cl.
CPC ...... *H04L 63/1416* (2013.01); *H04L 63/1425* (2013.01); *H04L 63/1433* (2013.01); *H04L 63/1475* (2013.01)

(58) Field of Classification Search
CPC ............. H04L 63/1425; H04L 63/1416; H04L 63/1433; H04L 63/1475; G06F 21/52; G06F 21/552; G06F 21/554
See application file for complete search history.

(56) References Cited

U.S. PATENT DOCUMENTS

| | | | |
|---|---|---|---|
| 10,084,811 B1 * | 9/2018 | Dinning | G06F 16/23 |
| 2005/0188215 A1 | 8/2005 | Shulman et al. | |
| 2014/0130161 A1 * | 5/2014 | Golovanov | H04L 63/1416 726/23 |
| 2014/0215621 A1 * | 7/2014 | Xaypanya | H04L 63/145 726/23 |
| 2015/0095891 A1 * | 4/2015 | Beskrovny | G06F 11/3672 717/125 |
| 2015/0222656 A1 * | 8/2015 | Haugsnes | G06F 16/24 726/23 |
| 2015/0350249 A1 * | 12/2015 | Reno | H04L 63/1433 726/1 |
| 2016/0308900 A1 * | 10/2016 | Sadika | H04L 63/1416 |
| 2016/0371484 A1 * | 12/2016 | Mehta | G06F 21/52 |
| 2017/0134407 A1 | 5/2017 | Mason | |

(Continued)

OTHER PUBLICATIONS

International Search Report and Written Opinion of the International Searching Authority issued in International Application No. PCT/EP2017/076605 dated May 4, 2018; 10 pages.

*Primary Examiner* — Izunna Okeke

(74) *Attorney, Agent, or Firm* — Fish & Richardson P.C.

(57) ABSTRACT

Systems, methods, and software can be used to detect remote application profiling. In some aspects, one computer-implemented method includes receiving, over a network, a request from a network client directed to a particular application executed by an application server; determining whether the received request deviates from a communications profile associated with the particular application; in response to determining that the received request deviates from the communications profile, identifying the network client as an attacker; and in response to identifying the network client as an attacker, performing a defensive response with respect to the network client.

14 Claims, 3 Drawing Sheets

(56) References Cited

U.S. PATENT DOCUMENTS

| | | | | |
|---|---|---|---|---|
| 2018/0219879 A1* | 8/2018 | Pierce | ............... | H04L 63/1416 |
| 2018/0329813 A1* | 11/2018 | Hamid | ............... | G06F 11/3688 |
| 2019/0042710 A1* | 2/2019 | Sukhomlinov | ......... | G06F 21/78 |

* cited by examiner

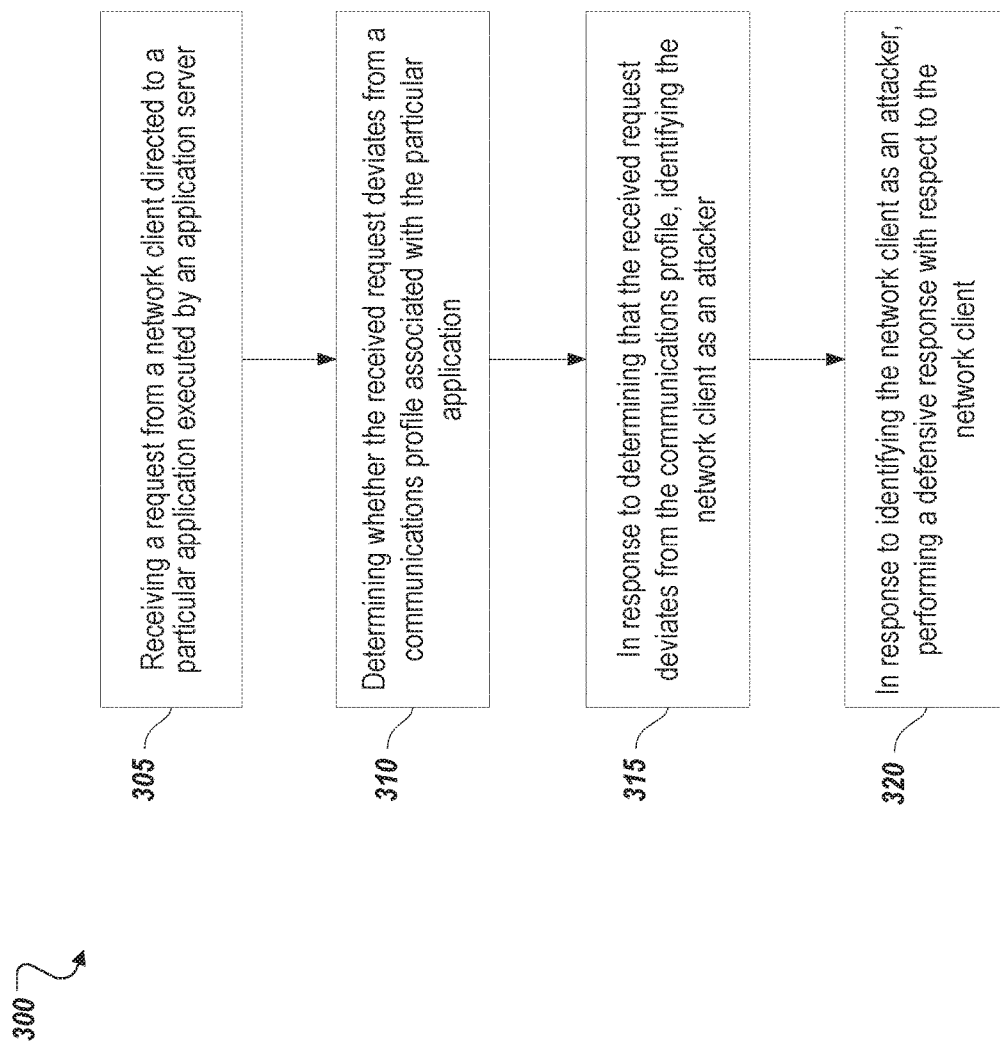

DETECTING REMOTE APPLICATION PROFILING

CROSS-REFERENCE TO RELATED APPLICATIONS

This application is a continuation of PCT Application No. PCT/EP2017/076605, filed on Oct. 18, 2017, which is hereby incorporated by reference in its entirety.

TECHNICAL FIELD

The present disclosure relates to detecting remote application profiling by identifying network traffic associated with such activity.

BACKGROUND

Network-enabled computer applications receive requests from clients over a network. In response to the received requests, the applications may perform actions indicated by the request (e.g., retrieving data from a local storage), and respond to the clients over the network (e.g., with a message including the retrieved data). Such applications may be configured to respond to particular messages by performing particular actions. This set of messages and associated actions makes up the application programming interface (API) for the application.

DESCRIPTION OF DRAWINGS

FIG. 3 is a flow diagram showing a method for detecting remote application profiling, according to an implementation.

Like reference numbers and designations in the various drawings indicate like elements.

DETAILED DESCRIPTION

In some cases, malicious actors (e.g., "attackers") may attempt to exploit network-enabled applications to compromise the security of a network. For example, an attacker may identify a vulnerability in an application that occurs when a particular message or sequence of messages is sent to the application. In some cases, such vulnerabilities can allow the attacker to gain access to sensitive data or even take control of the computing device executing the application.

Generally, exploiting such vulnerabilities in an application requires the attacker to have knowledge of how the application operates in response to received messages. In some cases, the attacker may attempt to deduce this information by "profiling" the application to identify such vulnerabilities. For example, in order to profile a particular application, an attacker may send malformed network traffic that does not conform to the API of the particular application. The attacker may use automated software tools to send a variety of different data sequences in order to find vulnerabilities within an application. The attacker may analyze the application's responses to these data sequences to gain a deeper insight into the behavior of the application. In some cases, an attacker may copy and paste uniform resource locators (URLs) associated with the application directly into a browser for testing, causing the browser to send Hypertext Transfer Protocol (HTTP) messages (e.g., "GET" requests) to the application. An attacker may also utilize other existing tools (such as wget or curl) to send requests to the application. Such profiling activity may be indicative of malicious intent by the attacker, even though the profiling activity itself may not compromise the application being profiled.

The present disclosure describes techniques to pro-actively identify an attacker profiling a network application and take automatic corrective action to prevent the attacker from identifying and exploiting vulnerabilities in the application. In one implementation, a request is received from a network client directed to a particular application executed by a computing device (e.g., an application server). A determination is made whether the received request deviates from a communications profile associated with the particular application. The communications profile may include information about the form and content of messages expected to be received by the application. The received request may be analyzed to determine whether its content or form deviates from what is expected by the application. In response to determining that the received request deviates from the communications profile, the network client is identified as an attacker. In response to identifying the network client as an attacker, a defensive response is performed with respect to the network client, such as blocking the network client from accessing the application or the network as a whole.

Figure 1:
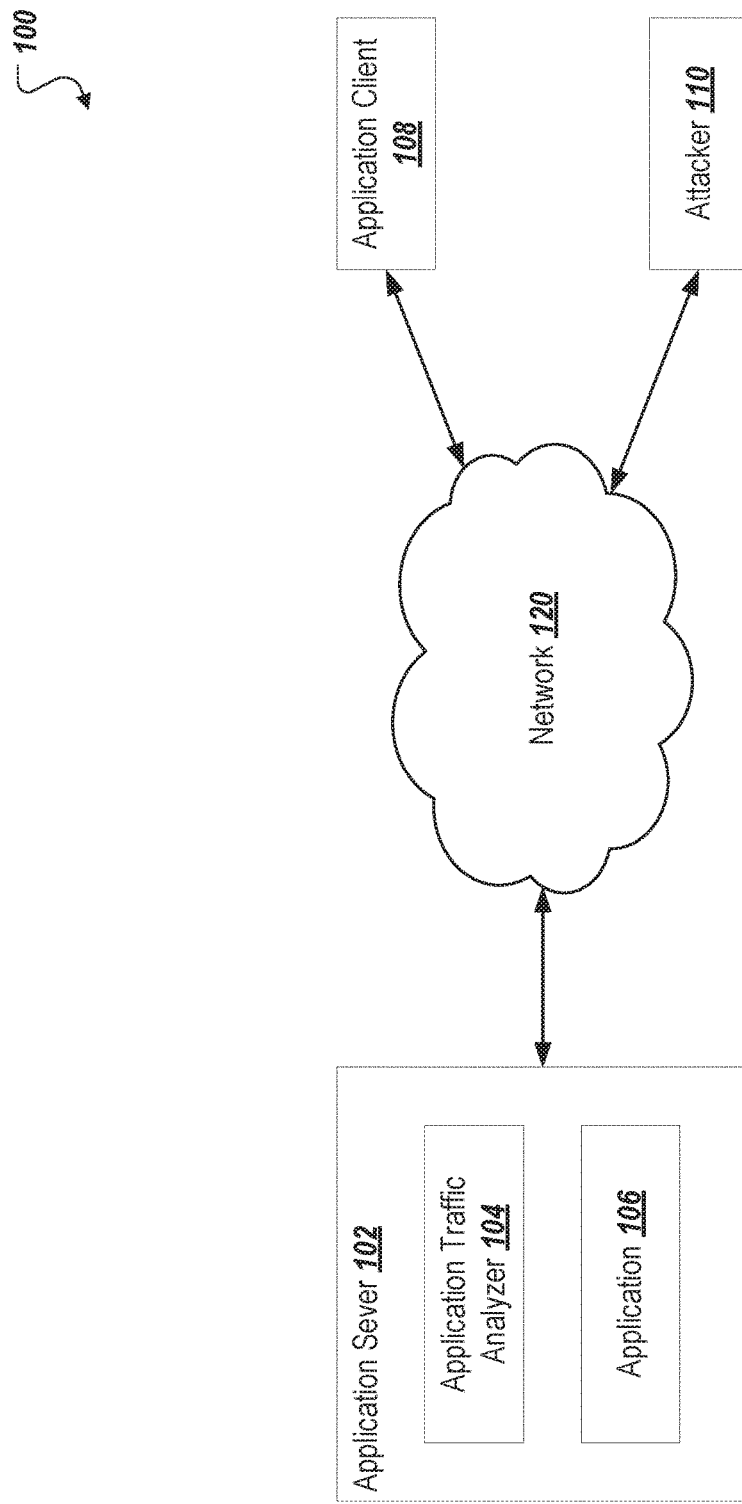
FIG. 1 is a schematic diagram showing a system that detects remote application profiling, according to an implementation.
Figure 2:
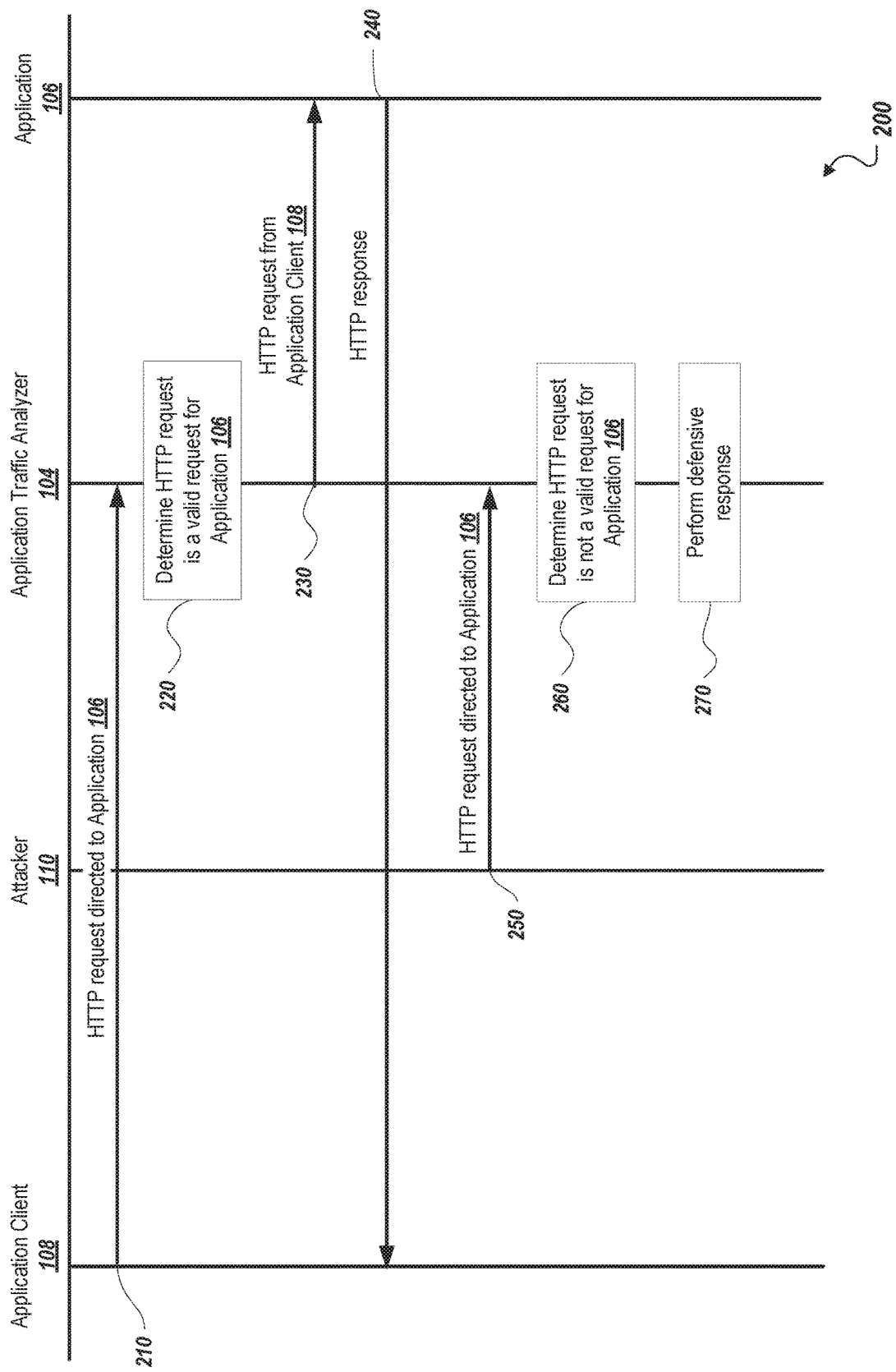
FIG. 2 is a swim lane diagram showing an interaction between components of the system of FIG. 1, according to an implementation.

FIGS. 1-3 and associated descriptions provide additional details of these implementations. These approaches provide a mechanism to increase network application security by identifying an attacker based on profiling actions. Because these profiling actions are meant to gain information about an application to formulate a later attack, the profiling actions generally occur before an actual attack on the application. The techniques described herein thus may allow an attacker to be identified and corrective action to be taken before an attack on the application is even attempted. Further, the present techniques may make it more difficult for an attacker to develop an attack against an application, because corrective action may be taken at the first sign of profiling. This corrective action may curtail the attacker's ability to send further messages to the application, making further profiling of the application and development an attack more difficult. In addition, by detecting profiling actions by examining messages at the application protocol layer (rather than at a lower layer such as the network layer), the behavior of the particular application may be considered in order to more accurately differentiate messages sent by legitimate clients of the application from messages sent by attackers attempting to profile the application.

FIG. 1 is a schematic diagram showing a system 100 that detects remote application profiling, according to an implementation. The system 100 includes an application server 102, application client 108, and an attacker 110 connected to a network 120. The application server 102 includes an application traffic analyzer 104 and an application 106.

The application server 102 comprises a computing device configured to provide a network application to clients over the network 120, and to detect remote application profiling by attackers. In some implementations, the application server 102 may include multiple computing devices in a distributed network collectively configured to provide the network application and to detect remote application profiling by attackers.

The application 106 comprises a software application configured to receive requests from the network 120 sent by clients (e.g., 108). The application 106 may be configured to perform one or more actions in response to a received request. For example, the application 106 may be a web server application configured to retrieve a webpage identified in a received request (e.g., by a URL) from a memory of the application server 102, and send a message including the retrieved webpage to the client sent the request over the network 120. The application 106 may be associated with an API defining the format and content of messages that can be sent to it and the actions perform in response to the messages. For example, the API of the application 106 may indicate that the application 106 will respond to an HTTP GET request including a URL of "/currenttime" by retrieving the current local time and returning a webpage including the retrieved time. The application 106 may communicate with clients over the network 120 using one or more communications protocols, including, but not limited to, Transmission Control Protocol (TCP), Universal Datagram Protocol (UDP), Internet Protocol (IP), HTTP, File Transfer Protocol (FTP), Simple Object Access Protocol (SOAP), Remote Procedure Call (RPC), or other protocols.

Application client 108 comprises a computing device configured to send requests to the application server 102 over the network 120 according to the API associated with the application 106. For example, the application client 108 may be software application executing on a computing device connected to the network 120 that is designed specifically to interact with the application 106. For example, the application client 108 may provide a user interface to the user allowing the user to access the application 106. In some implementations, the application client 108 may be a general-purpose application designed to send and receive messages to and from servers over a network, such as a web browser.

Attacker 110 comprises a computing device configured to send requests to the application server 102 in order to profile the behavior of the application 106. In contrast to the application client 108, the attacker 110 may send messages to the application 106 designed not to access the functionality of the application 106, but to provoke unexpected and possibly exploitable behavior by the application 106. In some implementations, the requests sent by the attacker 110 may not conform to the API of the application 106.

The application traffic analyzer 104 comprises a software application executing on the application server 102 configured to analyze incoming network traffic from the network 120, and identify messages that represent profiling of the application 106 by attackers (e.g. 110). In some implementations, the application traffic analyzer 104 may receive messages from the network 120, analyze the messages, and provide the received messages to the application 106 only if it determines that the received messages are from legitimate clients (e.g., 108) do not represent profiling by attackers (e.g. 110). The application traffic analyzer 104 may also be configured to passively monitor network traffic received by the application server 102.

In some implementations, the application traffic analyzer 104 may be configured to differentiate between messages sent by legitimate application clients (e.g., 108) and attackers (e.g., 110). The application traffic analyzer 104 perform this differentiation by comparing received messages to a communications profile associated with application 106. In some implementations, the communications profile may include information regarding the API of the application 106. In such a case, receive messages may be analyzed to determine whether they conform to the API of the application 106. If a received message conforms to the API of the application 106, the application traffic analyzer 104 may determine that the message was sent by a legitimate application client (e.g., 108). However, if the received message does not conform to the API of the application 106, the application traffic analyzer 104 may determine that the message was sent by an attacker (e.g., 110) as part of an attempt to profile the application 106. For example, if the API of the application 106 indicates that the application 106 response to only HTTP GET requests, a request received including a different HTTP verb (e.g., "POST") may indicate an attempt to profile the application 106, and cause the application traffic analyzer 104 to identify the client that sent the request as an attacker.

In some implementations, the application traffic analyzer 104 may analyze the content of the request to determine whether the message was sent by an attacker. For example, if the communications profile indicates that requests for the application should include HTTP user agent header with a value of "Okhttp/2.1," request with a different user agent header may be determined to deviate from the indications profile. This HTTP user agent header may identify the program that generated the request. Different programs populate the header with different values. For example, the OPERA web browser may send requests including the HTTP user agent header "Mozilla/5.0 (Linux; Android 4.0.4) AppleWebKit/537.36 (KHTML, like Gecko) OPR/15.0.1147.100." A request received with this user agent header would deviate from the communications profile of application 106, because this user agent header does not match the expected user agent header of "Okhttp/2.1" defined for application 106.

In response to determining that a request deviates from the communications profile, the application traffic analyzer 104 may identify the request as originating from an attacker, such as attacker 110. In some implementations, the application traffic analyzer 104 may perform additional analysis in identifying the request as originating from an attacker, including, but not limited to, checking an address from which the request is received against a list of known addresses, checking the subnet from which the request is received against a list of known subnets, or other analysis.

In response to determining that the request originated from an attacker, the application traffic analyzer 104 may perform one or more defensive actions. For example, the application traffic analyzer 104 may block an IP address associated with the attacker since the attacker will be unable to send future messages to the application server 102. In some implementations, the application traffic analyzer 104 may block the IP address of the attacker 110 for a period of time, and unblock it at the end of the period. The application traffic analyzer 104 may also block the IP address of the attacker 110 permanently. The application traffic analyzer 104 perform the blocking of the IP address of the attacker 110 by interacting with components of the application server 102, such as a network stack, or by interacting with network management components, such as routers or security appliances, associated with network 120 in order to block the IP address.

In some implementations, the one or more defensive actions may include the application traffic analyzer 104 logging a security issue associated with the received request. The security issue may include information about the received request as well as the identified attacker. The application traffic analyzer 104 may also generate an alert, such as to external systems or users, indicating that the attacker 110 has been identified.

FIG. 2 is a swim lane diagram showing an interaction 200 between components of the system 100 of FIG. 1, according to an implementation. At 210, the application client 108 sends an HTTP request directed to application 106. The HTTP request that 210 is received by the application traffic analyzer 104. At 220, the application traffic analyzer 104 determines that the HTTP request is a valid request for application 106. The application traffic analyzer 104 makes this determination based on the communications profile associated with the application 106, as described above. At 230, in response to determining that the HTTP request is a valid request, the application traffic analyzer 104 provides the HTTP request to application 106. At 240, the application 106 sends an HTTP response to the application client 108 in response to the received HTTP request.

At 250, the attacker 110 sends an HTTP request directed to application 106. HTTP request is received by the application traffic analyzer 104. The education traffic analyzer 104 determines that the received HTTP request is not a valid request for application 106. The application traffic analyzer 104 makes this determination based on the communications profile associated with the application 106, as described above. In response to determining that the HTTP request is not a valid request for application 106, the application traffic analyzer 104 performs one or more defensive responses, as described above.

FIG. 3 is a flow diagram showing a method 300 for detecting remote application profiling, according to an implementation. At 305, a request from a network client directed to a particular application executed by an application server is received by an application traffic analyzer (e.g., 104). In some implementations, the request is an HTTP request.

At 310, the application traffic analyzer (e.g., 104) determines whether the received request deviates from a communications profile associated with the particular application. In some cases, determining whether the received request deviates from the communications profile includes determining whether an HTTP user agent header included in the request deviates from an expected user agent header associated with the particular application. Determining whether the received request deviates from the communications profile may include determining whether an HTTP verb included in the request deviates from an expected user agent header associated with the particular application. In some implementations, determining whether the received request deviates from the communications profile includes determining whether the received request deviates from an expected request format associated with the particular application.

At 315, in response to determining that the received request deviates from the communications profile, the application traffic analyzer (e.g., 104) identifies the network client as an attacker.

At 320, in response to identifying the network client as an attacker, the application traffic analyzer (e.g., 104) performs a defensive response with respect to the network client. In some cases, performing the defensive response with respect to the network client includes blocking requests originating from an Internet Protocol (IP) address associated with the network client. Performing the defensive response with respect to the network client may also include generating an alert including information about the network client. Performing the defensive response with respect to the network client may also include logging a security issue including information about the network client.

In some implementations, in response to determining that the received request does not deviate from the communications profile, the received request is provided to the particular application.

Some of the subject matter and operations described in this disclosure can be implemented in digital electronic circuitry, or in computer software, firmware, or hardware, including the structures described in this disclosure and their structural equivalents, or in combinations of one or more of them. Some of the subject matter described in this disclosure can be implemented as one or more computer programs, i.e., one or more modules of computer program instructions, encoded on a computer storage medium for execution by, or to control the operation of, data-processing apparatus. Alternatively or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or any combinations of computer-storage mediums.

The terms "data-processing apparatus," "computer," or "electronic computer device" encompass all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable, conventional operating system.

A computer program, which may also be referred to, or described, as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site, or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

Some of the processes and logic flows described in this disclosure can be performed by one or more programmable processors, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory, or both. A processor can include by way of example a programmable processor, a computer, a system on a chip, or multiple ones, or combinations of the foregoing. A processor can include special purpose logic circuitry, e.g., an FPGA (field programmable gate array) or an ASIC (application specific integrated circuit).

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices, for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including, by way of example, semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry. In some cases, the computer storage medium can be transitory, non-transitory, or a combination thereof.

To provide for interaction with a user, implementations of the subject matter described in this disclosure can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to, and receiving documents from a device that is used by the user, for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this disclosure can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system, or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, either hardware or software (or a combination of hardware and software), may interface with each other, or the interface using an application programming interface (API), or a service layer (or a combination of API and service layer). The API may include specifications for routines, data structures, and object classes. The API may be either computer language, independent or dependent, and refer to a complete interface, a single function, or even a set of APIs. The service layer provides software services to the computing system. The functionality of the various components of the computing system may be accessible for all service users using this service layer. Software services provide reusable, defined business functionalities through a defined interface. For example, the interface may be software written in JAVA, C++, or other suitable language providing data in extensible markup language (XML) format or other suitable format. The API or service layer (or a combination of the API and the service layer) may be an integral or a stand-alone component in relation to other components of the computing system. Moreover, any or all parts of the service layer may be implemented as child or sub-modules of another software module, enterprise application, or hardware module without departing from the scope of this disclosure.

While this disclosure contains many specific implementation details, these should not be construed as limitations on the scope of any invention or on the scope of what may be claimed, but rather as descriptions of features that may be specific to particular implementations of particular inventions. Certain features that are described in this disclosure in the context of separate implementations can also be implemented, in combination, in a single implementation. Conversely, various features that are described in the context of a single implementation can also be implemented in multiple implementations, separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can, generally, be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the computer-readable medium.

The invention claimed is:

1. A method, comprising:
receiving, over a network, a request from a network client directed to a particular application executed by an application server;
determining that the received request includes an action that is different from application programing interface (API) actions defined in a communications profile associated with the particular application, wherein the communications profile associated with the particular application defines one or more API actions that are accepted by the particular application, and wherein the request is a Hypertext Transfer Protocol (HTTP) request, the communications profile associated with the particular application defines a particular value associated with the particular application, and determining that the received request includes the action that is different from API actions defined in the communications profile comprises determination that an HTTP user agent header included in the received request has a value that is different from the particular value defined in the communications profile;
in response to determining that the received request includes the action that is different from API actions defined in the communications profile, identifying the network client as an attacker; and
in response to identifying the network client as the attacker, performing a defensive response with respect to the network client that sends the request, wherein performing the defensive response includes blocking requests originating from an Internet Protocol (IP) address associated with the network client for a configured period of time.

2. The method of claim 1, further comprising:
in response to determining that the received request does not deviate from the communications profile, providing the received request to the particular application.

3. The method of claim 1, wherein determining whether the received request deviates from the communications profile includes determining whether an HTTP verb included in the request deviates from an expected user agent header associated with the particular application.

4. The method of claim 1, wherein determining whether the received request deviates from the communications profile includes determining whether the received request deviates from an expected request format associated with the particular application.

5. The method of claim 1, wherein performing the defensive response with respect to the network client includes generating an alert including information about the network client.

6. The method of claim 1, wherein performing the defensive response with respect to the network client includes logging a security issue including information about the network client.

7. A computing device, comprising:
at least one hardware processor;
a non-transitory computer-readable storage medium coupled to the at least one hardware processor and storing programming instructions for execution by the at least one hardware processor, wherein the programming instructions, when executed, cause the at least one hardware processor to perform operations comprising:
receiving, over a network, a request from a network client directed to a particular application executed by an application server;
determining that the received request includes an action that is different from application programing interface (API) actions defined in a communications profile associated with the particular application, wherein the communications profile associated with the particular application defines one or more API actions that are accepted by the particular application, and wherein the request is a Hypertext Transfer Protocol (HTTP) request, the communications profile associated with the particular application defines a particular value associated with the particular application, and determining that the received request includes the action that is different from API actions defined in the communications profile comprises determination that an HTTP user agent header included in the received request has a value that is different from the particular value defined in the communications profile;
in response to determining that the received request includes the action that is different from API actions defined in the communications profile, identifying the network client as an attacker; and
in response to identifying the network client as the attacker, performing a defensive response with respect to the network client that sends the request, wherein performing the defensive response includes blocking requests originating from an Internet Protocol (IP) address associated with the network client for a configured period of time.

8. The computing device of claim 7, the operations further comprising:
in response to determining that the received request does not deviate from the communications profile, providing the received request to the particular application.

9. The computing device of claim 7, wherein determining whether the received request deviates from the communications profile includes determining whether an HTTP verb included in the request deviates from an expected user agent header associated with the particular application.

10. The computing device of claim 7, wherein determining whether the received request deviates from the communications profile includes determining whether the received request deviates from an expected request format associated with the particular application.

11. The computing device of claim 7, wherein performing the defensive response with respect to the network client includes generating an alert including information about the network client.

12. The computing device of claim 7, wherein performing the defensive response with respect to the network client includes logging a security issue including information about the network client.

13. One or more non-transitory computer-readable media containing instructions which, when executed, cause a computing device to perform operations comprising:
receiving, over a network, a request from a network client directed to a particular application executed by an application server;
determining that the received request includes an action that is different from application programing interface (API) actions defined in a communications profile associated with the particular application, wherein the communications profile associated with the particular application defines one or more API actions that are accepted by the particular application, and wherein the request is a Hypertext Transfer Protocol (HTTP) request, the communications profile associated with the particular application defines a particular value associated with the particular application, and determining that the received request includes the action that is different from API actions defined in the communications profile comprises determination that an HTTP user agent header included in the received request has a value that is different from the particular value defined in the communications profile;
in response to determining that the received request includes the action that is different from API actions defined in the communications profile, identifying the network client as an attacker; and
in response to identifying the network client as the attacker, performing a defensive response with respect to the network client that sends the request, wherein performing the defensive response includes blocking requests originating from an Internet Protocol (IP) address associated with the network client for a configured period of time.

14. The one or more non-transitory computer-readable media of claim 13, the operations further comprising:
in response to determining that the received request does not deviate from the communications profile, providing the received request to the particular application.

* * * * *